United States Patent
Brusky

(10) Patent No.: US 9,254,881 B2
(45) Date of Patent: Feb. 9, 2016

(54) BEVERAGE HOLDER

(71) Applicant: Nancy Ann Brusky, Presque Isle, WI (US)

(72) Inventor: Nancy Ann Brusky, Presque Isle, WI (US)

(*) Notice: Subject to any disclaimer, the term of this patent is extended or adjusted under 35 U.S.C. 154(b) by 0 days.

(21) Appl. No.: 14/320,622

(22) Filed: Jun. 30, 2014

(65) Prior Publication Data

US 2015/0028074 A1 Jan. 29, 2015

Related U.S. Application Data

(60) Provisional application No. 61/857,659, filed on Jul. 23, 2013.

(51) Int. Cl.
| | |
|---|---|
| *B60N 3/10* | (2006.01) |
| *B62J 11/00* | (2006.01) |
| *B60N 3/18* | (2006.01) |
| *A47C 7/70* | (2006.01) |

(52) U.S. Cl.
CPC .. *B62J 11/00* (2013.01); *A47C 7/70* (2013.01); *B60N 3/18* (2013.01)

(58) Field of Classification Search
CPC ............... A45F 3/14; A45F 3/02; A61J 9/06; B60N 3/10; B60N 3/18; B60N 2/468; A47C 7/68; A47C 7/70
See application file for complete search history.

(56) References Cited

U.S. PATENT DOCUMENTS

| | | | | |
|---|---|---|---|---|
| 4,337,938 A | * | 7/1982 | Rodriguez | ............... 482/74 |
| 4,867,359 A | * | 9/1989 | Donovan | ............... 224/602 |
| D698,541 S | * | 2/2014 | Schulte, II | ............... D3/213 |

* cited by examiner

*Primary Examiner* — Corey Skurdal

(57) ABSTRACT

A beverage holder is provided. The beverage holder may include a strap assembly connected to a beverage assembly. The beverage assembly is adapted to retain beverage containers therein. The strap assembly may include a first strap member and a second strap member. The first strap member may terminate in an arm loop and an opposing clasp end. The clasp end may form a clasp loop for securing a strap clasp. The second strap member may terminate in an arm loop and an opposing return end. The return end may provide both of one half of a mating hook-and-loop combination. The hook portion and the loop portion may be securely engaged to form a return loop, whereby the overall desired length of the entire resulting strap assembly may be varied by adjusting the portion of the hook portion that overlaps the loop portion. A user may place each arm loop over each of a pair of armrests, whereby both strap members are routed around the backrest so as to slide the return end through the strap clasp. Then the user may fold the return end to form the return loop by mating the hook and the loop portion so as to define the desired length of the entire resulting strap assembly and tightness about the backrest.

9 Claims, 3 Drawing Sheets

BEVERAGE HOLDER

CROSS-REFERENCE TO RELATED APPLICATION

This application claims the benefit of priority of U.S. provisional application No. 61/857,659, filed 23 Jul. 2013, the contents of which are herein incorporated by reference.

BACKGROUND OF THE INVENTION

The present invention relates to beverage holders and, more particularly, to beverage holders for passenger use on motorcycles with a back rest with an armrest.

Currently, there are no easily mounted beverage holders for passengers on motor vehicles with standard armrest backrest, such as Harley Davidson motorcycles, wherein such beverage holders do not require modifying the motor vehicle, do not make the beverage hard to reach, do not detract from the aesthetic of the motor vehicle and do not hold the beverage near the vehicle's engine. Other passenger beverage holder systems require drilling, clamping or gluing of hardware to be mounted, thereby requiring modifying the motor vehicle, as well as detracting from the vehicles appearance. Other systems also hold the beverage in places that are difficult for the passenger to reach or hold the beverage near the hot engine, undesirably warming the beverage.

As can be seen, there is a need for a vehicle beverage holder that can be easily deployed, easily removed, easy to reach and does not require a destructive mount or otherwise detracts from the appearance of the underlying vehicle.

SUMMARY OF THE INVENTION

In one aspect of the present invention, a beverage holder comprises; a first elongated flexible strap member terminating in a first arm loop and an opposing strap clasp; and an elongated flexible second strap member terminating in a second arm loop and an opposing return end, wherein the return end provides a surface having a first part and a corresponding second part of a two part flexible hook-and-loop fastener secured thereto; and at least one container receptacle providing material forming a generally cylindrical tube, wherein the at least one container receptacle is connected to at least one strap member.

In another aspect of the present invention, a method of holding at least one beverage container for passenger use on motorcycles with a backrest having a pair of armrests, comprises: providing a beverage holder comprising: a first elongated flexible strap member terminating in a first arm loop and an opposing strap clasp; and an elongated flexible second strap member terminating in a second arm loop and an opposing return end, wherein the return end provides a surface having a first part and corresponding second part of a two part flexible hook-and-loop fastener secured thereto; and at least one container receptacle providing material forming a generally cylindrical tube connected to each strap member; placing each arm loop on each of the pair of armrests; routing the first and second strap member about the opposing sides of the backrest so that the return end slides through the strap clasp; folding the return end so as to engage the first and second part of the two part flexible hook-and-loop fastener, forming the return loop; and adjusting the length of the return loop so that the beverage holder is securely attached to the backrest and so that the at least one container receptacle is operable for holding the at least one beverage container.

These and other features, aspects and advantages of the present invention will become better understood with reference to the following drawings, description and claims.

DETAILED DESCRIPTION OF THE INVENTION

Figure 1:
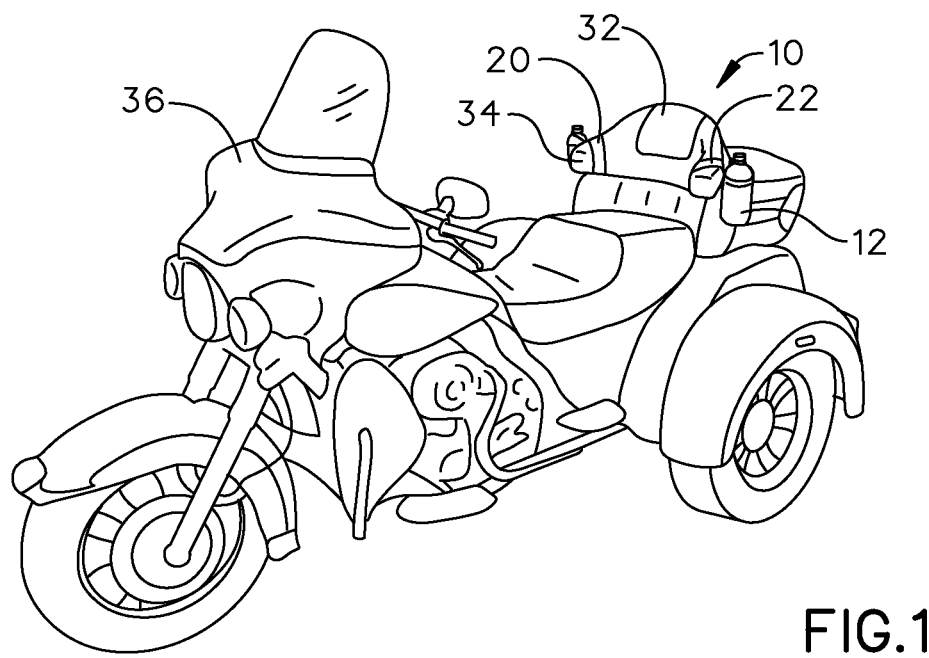
FIG. 1 is a perspective view of an exemplary embodiment of the present invention shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a beverage holder. The beverage holder may include a strap assembly connected to a beverage assembly. The beverage assembly is adapted to retain beverage containers therein. The strap assembly may include a first strap member and a second strap member. The first strap member may terminate in an arm loop and an opposing clasp end. The clasp end may form a clasp loop for securing a strap clasp. The second strap member may terminate in an arm loop and an opposing return end. The return end may provide both of one half of a mating hook-and-loop combination. The hook portion and the loop portion may be securely engaged to form a return loop, whereby the overall desired length of the entire resulting strap assembly may be varied by adjusting the portion of the hook portion that overlaps the loop portion. A user may place each arm loop over each of a pair of armrests, whereby both strap members are routed around the backrest so as to slide the return end through the strap clasp. Then the user may fold the return end to form the return loop by mating the hook and the loop portion so as to define the desired length of the entire resulting strap assembly and tightness about the backrest.

Referring to FIGS. 1 through 5, the present invention may include a beverage holder 10. The beverage holder 10 may be adapted, but not limited, to be operable on a motorcycle 36 with a combination of a backrest 32 and at least one armrest 34, such as, by way of example, found on a Harley Davidson Electra Glide. Though, the beverage holder 10 may be operable on various types of motorcycles 36, vehicles, chairs and the like.

The beverage holder 10 may include a strap assembly 40 and a beverage assembly 50. The strap assembly 40 may be made of resilient, flexible material so as to resist significant longitudinal forces applied thereto. The strap assembly 40 may include a first strap member 20 and a second strap member 22.

Figure 2:
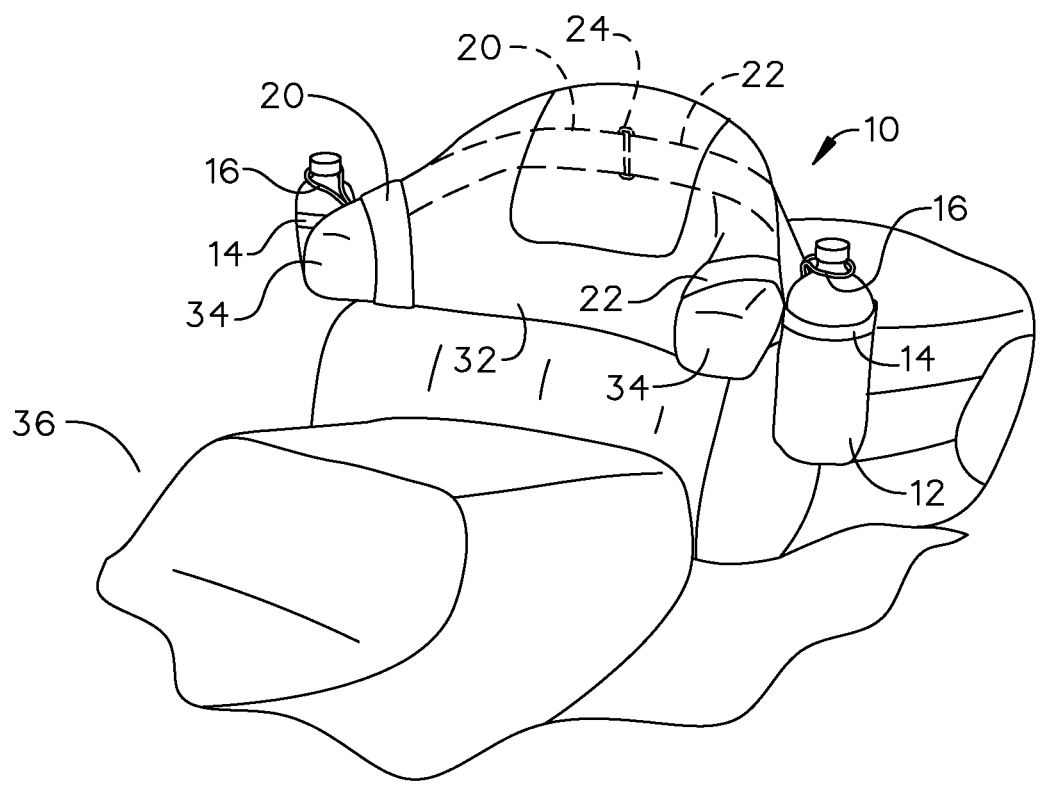
FIG. 2 is a detail perspective view of an exemplary embodiment of the present invention shown in use.
Figure 3:
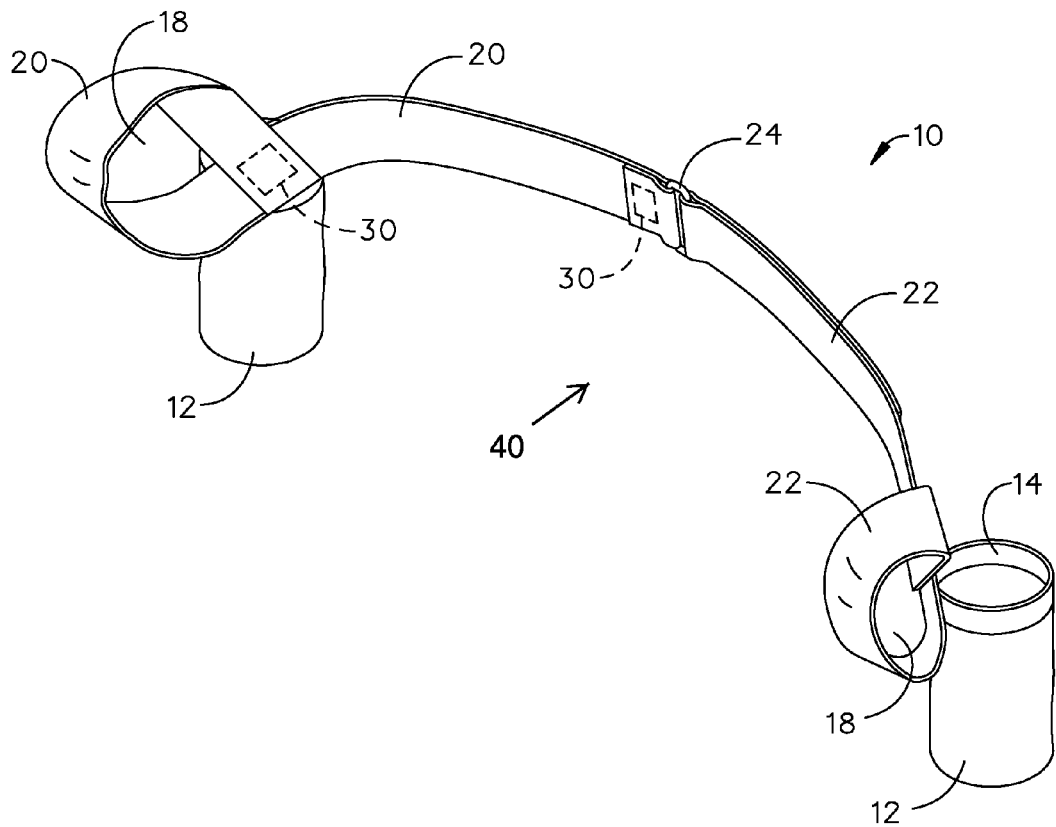
FIG. 3 is a perspective view of an exemplary embodiment of the present invention.
Figure 4:
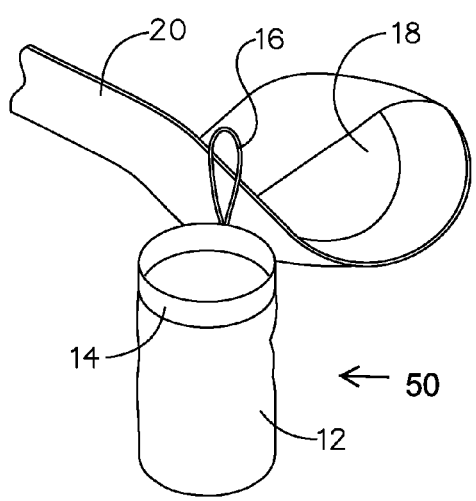
FIG. 4 is a detail perspective view of an exemplary embodiment of an arm loop of the present invention.
Figure 5:
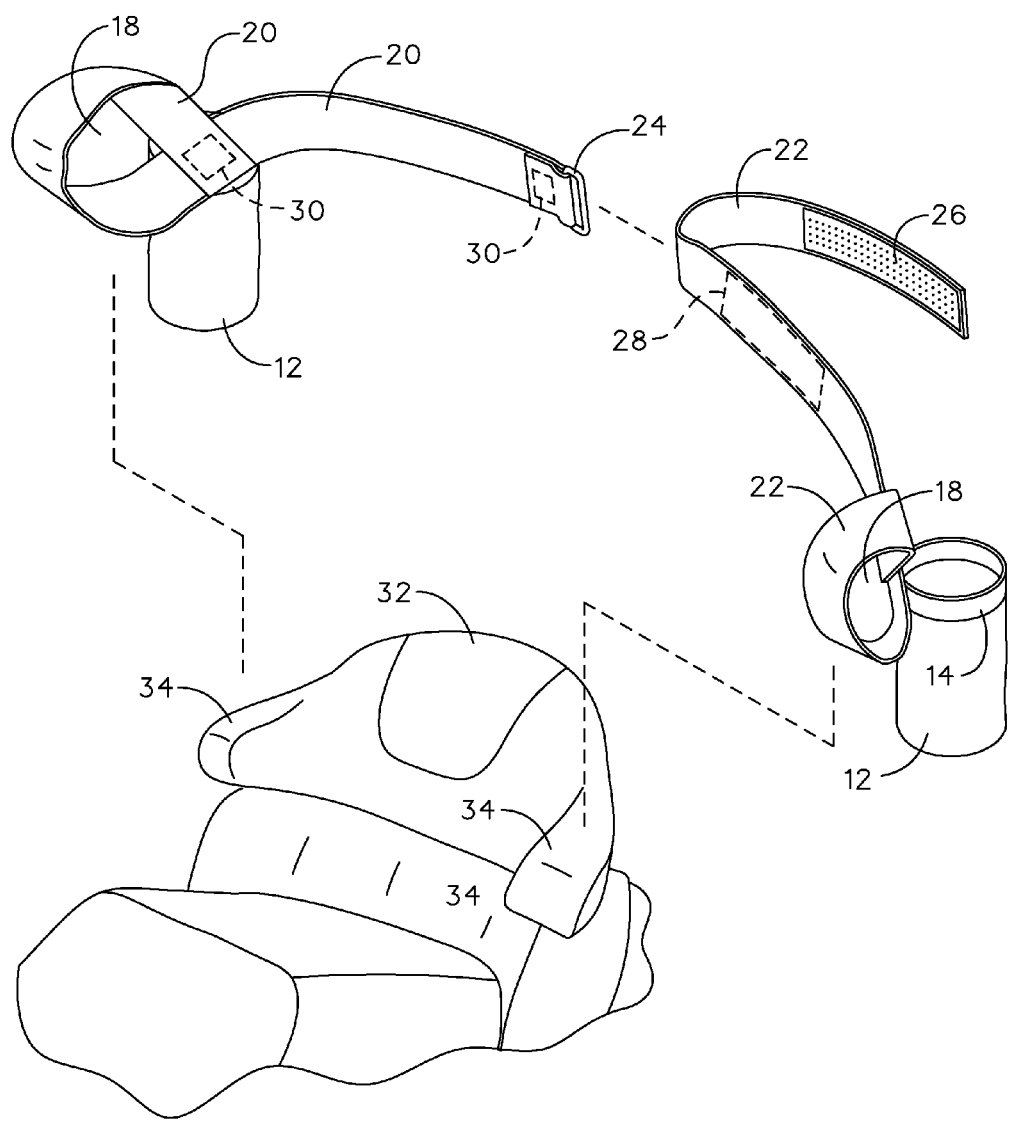
FIG. 5 is an exploded view of an exemplary embodiment of the present invention.

The first strap member 20 may terminate in a anchor end and an opposing clasp end. The first strap member 20 may have an interior surface and an exterior surface. A clasp loop may be formed in the clasp end in a well-known manner, for example, by coupling together different portions of the clasp end by using at least one of a plurality of fasteners 30, as illustrated in FIG. 5. A strap clasp 24 may be connected to the clasp end by being secured within the clasp loop. The strap clasp 24 may be any ring-like clasp, for example a D-ring, currently known. The anchor end may terminate in an arm loop 18. The arm loop 18 may be formed by coupling together a first and a second portion of the anchor end so as the exterior surface of the first portion may be coupled to the interior surface of the second portion, as illustrated in FIG. 3. Such coupling may be secured by use of at least one of a plurality of fasteners 30. The dimensions and shape of the arm loop 18 may be adapted to receive a portion of the armrest 34, as illustrated in FIG. 2. Each arm loop 18 may be adapted to be reversible, meaning that each arm loop 18 may snugly receive the portion of the armrest 34 from either side of the arm loop 18.

The second strap member 22 may terminate in an anchor end and an opposing return end. The anchor end may terminate in an arm loop 18. The arm loop 18 may be formed by coupling together a first and a second portion of the anchor end so as the exterior surface of the first portion may be coupled to the interior surface of the second portion, as illustrated in FIG. 3. Such coupling may be secured by use of at least one of a plurality of fasteners 30. The dimensions and shape of the arm loop 18 may be adapted to receive a portion of an armrest 34, as illustrated in FIG. 2. The return end may provide both of one half of a mating hook-and-loop combination 26, 28 securely fastened to the same surface of at least part of the length of the return end. The hook portion 26 and the loop portion 28 may be any known design and construction such as is commercially available under the trademark Velcro. The hook portion 26 and the loop portion 28 may be securely engaged to form a return loop, whereby the overall desired length of the return loop, of the remaining portion of the second strap member 22 and/or of the entire resulting strap assembly 40 may be varied by adjusting the portion of the hook portion 26 that overlaps the loop portion 28.

The beverage assembly 50 may include at least one container receptacle 12, at least one receptacle collar 14 and at least one receptacle loop 16. The at least one container receptacle 12 may be made of a sufficiently resilient material forming a generally cylindrical tube adapted to retain a beverage container. The beverage container may be an aluminum can, glass bottle, plastic bottle and the like. Each container receptacle may provide material and/or a closing for one of the ends of the generally cylindrical tube adapted to retain a beverage container. It being understood that the provided material and/or closing(s) may be provided on the same relative end of a plurality of container receptacles so as to maintain the reversibility of the beverage holder. The material of the container receptacle 12 may function to insulate the beverage container. Each container receptacle 12 may include the at least one receptacle collar 14 encircling the non-closed opening so as to provide a finished edge that defines said non-closed opening. Each container receptacle 12 may include the at least one receptacle loop 16 made of elastic material forming a loop adapted to removably engage a portion of the beverage container so as to prevent the beverage container from sliding out of or too far away from the container receptacle 12.

Each beverage assembly 50 may be connected to the strap assembly 40 by a plurality of fasteners 30 or in any convenient and efficient manner (sewing and the like). In a certain embodiment, each beverage assembly 50 may be disposed near the coupling that forms the arm loop 18. In an alternative embodiment, the connection of each beverage assembly 50 and the coupling of each arm loop may be integrated so as to use the same plurality of fasteners 30.

It should be understood that the plurality of fasteners 30 may be any fastener known in the art for removably fastening or securing one object to another including, for example, standard push-button snaps, Velcro-type fasteners, adhesive substances, combinations thereof, and the like. In certain embodiments, the plurality of fasteners 30 may be any fastener known in the art for fastening or securing one object to another including, for example, sewing, stitching and the like, so long as the fasteners 30 function in accordance with the present invention as described herein.

A method of using the present invention may include the following. The beverage holder 10 disclosed above may be provided. A user may place the arm loop 18 of the first strap member 20 over a first armrest 34 preceded or followed by the user placing the arm loop 18 of the second strap member 22 over a second armrest 34. Then the user may route the strap members 20, 22 around the front or back of the backrest 32 so as to slide the return end through the strap clasp 24. Then the user may fold the return end to form the return loop by mating the hook portion 26 and the loop portion 28 so as to define the desired length of the entire resulting strap assembly 40. In certain embodiments, the user may vary and/or tighten such length so as to frictionally engage the surface of the first strap member 20 and/or the second strap member 22 to the backrest 32. The user may vary the desired length to a predetermined tension across the beverage holder 10 and/or at one or both of the arm loops 18. Each beverage assembly 50 may end up located outboard of each armrest 34 so that the non-closed opening of the container receptacle(s) 12 are face upwardly. Then the user may insert the beverage container(s) in the container receptacle(s) 12, and lasso the neck or other portion of each beverage container with the respective receptacle loop 16.

In certain embodiments, only on arm loop 18 of one strap member may be anchored to one armrest 34, wherein the other anchor end of the other strap member is anchored to a portion of the vehicle, the backrest 32 and/or the armrest 34 to facilitate the securing of the strap assembly 40.

In certain embodiments, the beverage holder may be reversed for finding the best fit, meaning that the user may use either surface of either strap member 20, 22 to engage the surface of the backrest 32, as each arm loop 18 is reversible.

It should be understood, of course, that the foregoing relates to exemplary embodiments of the invention and that modifications may be made without departing from the spirit and scope of the invention as set forth in the following claims.

What is claimed is:

1. A beverage holder comprising:
   a first elongated flexible strap member terminating in a first anchor end and an opposing strap clasp;
   an elongated flexible second strap member terminating in a second anchor end and an opposing return end forming a return loop though the strap clasp, wherein each strap member has an exterior surface and an opposing interior surface, and wherein each anchor end has a first portion and a second portion;
   at least one container receptacle coupled to the exterior surface of each second portion; and
   an arm loop formed from each anchor end by coupling the exterior surface of the first portion to the interior surface of the second portion, wherein each arm loop is shaped to receive a portion of an armrest.

2. The beverage holder of claim 1, wherein each arm loop is dimensioned to secure to the armrest.

3. The beverage holder of claim 1, wherein each container receptacle is dimensioned to retain a beverage container.

4. The beverage holder of claim 3, further including a receptacle collar encircling an open end of the container receptacle.

5. The beverage holder of claim 4, further including a receptacle loop connected to each container receptacle, wherein the receptacle loop is adapted to lasso a portion of the beverage container.

6. The beverage holder of claim 1, further comprising a stitching that couples each first portion and each container receptacle to each second portion,
whereby one fastener couples all three elements together.

7. A method of holding at least one beverage container for passenger use on motorcycles with a backrest having a pair of armrests, comprising:
providing a beverage holder comprising: a first elongated flexible strap member terminating in a first anchor end and an opposing strap clasp; and an elongated flexible second strap member terminating in a second anchor end and an opposing return end, wherein each strap member has an exterior surface and an opposing interior surface, wherein each anchor end has a first portion and a second portion, wherein an arm loop is formed from each anchor end by coupling the exterior surface of the first portion to the interior surface of the second portion, and wherein each arm loop is shaped to receive a portion of an armrest; and at least one container receptacle connected to each strap member;
placing each arm loop on each of the pair of armrests;
routing the first and second strap member about the opposing sides of the backrest so that the return end slides through the strap clasp;
folding the return end so as to couple two portions thereof, forming an adjustable return loop; and
adjusting a length of the return loop so that the beverage holder is securely attached to the backrest and so that each container receptacle is operable for holding one beverage container.

8. The method of claim 7, further including reversing the beverage holder from an original application of claim 7 so that the opposing surface of each strap member engages the backrest.

9. The method of claim 7, wherein each arm loop is placed on each of the pair of armrests from a direction opposite of the original application.

* * * * *